United States Patent
Sarkar et al.

(10) Patent No.: US 10,788,831 B2
(45) Date of Patent: Sep. 29, 2020

(54) METHOD AND DEVICE FOR IDENTIFYING CENTER OF A PATH FOR NAVIGATION OF AUTONOMOUS VEHICLES

(71) Applicant: WIPRO LIMITED, Bangalore (IN)

(72) Inventors: Manas Sarkar, Kolkata (IN); Balaji Sunil Kumar, Bengaluru (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 176 days.

(21) Appl. No.: 15/840,188

(22) Filed: Dec. 13, 2017

(65) Prior Publication Data

US 2019/0107838 A1  Apr. 11, 2019

(30) Foreign Application Priority Data

Oct. 6, 2017  (IN) .............................. 201741035571

(51) Int. Cl.
| | | |
|---|---|---|
| *G05D 1/02* | (2020.01) | |
| *G05D 1/00* | (2006.01) | |
| *G08G 1/16* | (2006.01) | |
| *B60W 30/095* | (2012.01) | |

(52) U.S. Cl.
CPC ....... *G05D 1/0212* (2013.01); *B60W 30/0956* (2013.01); *G05D 1/0088* (2013.01); *G05D 1/024* (2013.01); *G05D 1/0274* (2013.01); *G08G 1/167* (2013.01); *B60W 2554/00* (2020.02); *G05D 2201/0213* (2013.01)

(58) Field of Classification Search
CPC .. G05D 1/0212; G05D 1/0088; G05D 1/0246; G05D 1/0202; G05D 1/0213; G05D 1/0231; G05D 1/02; B60W 30/0956; B60W 30/14; B60W 2420/42; B60W 30/18; B60W 30/095
See application file for complete search history.

(56) References Cited

U.S. PATENT DOCUMENTS

| | | | |
|---|---|---|---|
| 6,614,917 B1 * | 9/2003 | Phillips | ................ G06K 9/3241 382/103 |
| 8,170,739 B2 | 5/2012 | Lee | |
| 8,605,947 B2 * | 12/2013 | Zhang | ................ G06K 9/00798 348/116 |

(Continued)

*Primary Examiner* — Hunter B Lonsberry
*Assistant Examiner* — Luis A Martinez Borrero
(74) *Attorney, Agent, or Firm* — Finnegan, Henderson, Farabow, Garrett & Dunner, LLP

(57) ABSTRACT

Method and device for identifying center of a path for navigation of an autonomous vehicle is disclosed. The method includes receiving a navigation map for a path connecting a destination point and an autonomous vehicle location point. The method further includes identifying a plurality of obstruction points along boundaries of the path based on the navigation map. The method includes determining a plurality of halfway points on the path based on the plurality of obstruction points. A halfway point is located between a straight line joining two consecutively identified obstruction points. The method further includes discarding at least one of the plurality of halfway points to extract a final set of halfway points on the path. The method includes arranging halfway points in the final set in a sequential order starting from the destination point to the autonomous vehicle location point.

19 Claims, 11 Drawing Sheets

(56) References Cited

U.S. PATENT DOCUMENTS

| | | | |
|---|---|---|---|
| 8,878,865 B2* | 11/2014 | Altman | G06T 17/05 345/420 |
| 9,072,929 B1* | 7/2015 | Rush | G09B 19/003 |
| 9,098,754 B1* | 8/2015 | Stout | G01S 17/89 |
| 9,291,460 B2* | 3/2016 | Ettinger | G01C 21/206 |
| 9,404,764 B2* | 8/2016 | Lynch | G06T 17/05 |
| 10,127,470 B2* | 11/2018 | Zheng | G16H 50/30 |
| 10,210,403 B2* | 2/2019 | Mittal | G06K 9/00798 |
| 10,210,411 B2* | 2/2019 | Mittal | G06K 9/6262 |
| 10,293,485 B2* | 5/2019 | Sinyavskiy | A47L 11/4011 |
| 10,395,117 B1* | 8/2019 | Zhang | G06K 9/4604 |
| 10,444,398 B2* | 10/2019 | Muensterer | G01S 17/89 |
| 10,509,413 B2* | 12/2019 | Mou | G01S 17/87 |
| 10,585,436 B2* | 3/2020 | Sunil Kumar | G01C 21/26 |
| 10,591,605 B2* | 3/2020 | Smits | G01C 21/3461 |
| 2005/0058155 A1* | 3/2005 | Mikuriya | H04Q 3/0062 370/474 |
| 2007/0106473 A1* | 5/2007 | Bodin | G08G 5/0069 701/301 |
| 2008/0165182 A1* | 7/2008 | Geelen | G01C 21/36 345/419 |
| 2010/0004802 A1* | 1/2010 | Bodin | G05D 1/0038 701/11 |
| 2010/0084513 A1* | 4/2010 | Gariepy | B64C 39/024 244/190 |
| 2010/0098290 A1* | 4/2010 | Zhang | G06K 9/00798 382/100 |
| 2010/0098295 A1* | 4/2010 | Zhang | G06K 9/00798 382/103 |
| 2010/0104137 A1* | 4/2010 | Zhang | G06K 9/4609 382/104 |
| 2010/0104199 A1* | 4/2010 | Zhang | G08G 1/165 382/199 |
| 2010/0121577 A1* | 5/2010 | Zhang | G01S 17/931 701/301 |
| 2010/0250125 A1* | 9/2010 | Lundberg | H04N 13/239 701/532 |
| 2010/0268452 A1* | 10/2010 | Kindo | G01C 21/28 701/533 |
| 2011/0216935 A1* | 9/2011 | Mays | G06K 9/46 382/100 |
| 2012/0163662 A1* | 6/2012 | Lee | G06K 9/00651 382/103 |
| 2013/0069944 A1* | 3/2013 | Altman | G09B 29/106 345/420 |
| 2013/0131978 A1* | 5/2013 | Han | G06T 15/20 701/436 |
| 2013/0169668 A1* | 7/2013 | Lynch | G01S 17/89 345/619 |
| 2013/0169685 A1* | 7/2013 | Lynch | G06T 7/521 345/634 |
| 2015/0153180 A1* | 6/2015 | Ettinger | G01C 21/206 701/410 |
| 2015/0254982 A1* | 9/2015 | Goudy | G08G 1/163 340/435 |
| 2016/0035081 A1* | 2/2016 | Stout | G01S 17/89 382/103 |
| 2016/0129593 A1* | 5/2016 | Wolowelsky | B25J 9/163 700/253 |
| 2016/0292905 A1* | 10/2016 | Nehmadi | G01S 17/931 |
| 2017/0008521 A1* | 1/2017 | Braunstein | G01C 21/3407 |
| 2017/0039443 A1* | 2/2017 | Zheng | G06K 9/42 |
| 2017/0116477 A1* | 4/2017 | Chen | G06K 9/00651 |
| 2017/0242108 A1* | 8/2017 | Dussan | G01S 7/487 |
| 2017/0285648 A1* | 10/2017 | Welty | B25J 5/007 |
| 2017/0307397 A1* | 10/2017 | Sorstedt | B60W 40/06 |
| 2017/0332068 A1* | 11/2017 | Schmollgruber | H04N 5/23254 |
| 2017/0371348 A1* | 12/2017 | Mou | G01S 17/86 |
| 2018/0074508 A1* | 3/2018 | Kleiner | A47L 9/0488 |
| 2018/0107226 A1* | 4/2018 | Yang | G05D 1/0274 |
| 2018/0120116 A1* | 5/2018 | Rombouts | G01C 21/32 |
| 2018/0281191 A1* | 10/2018 | Sinyavskiy | A47L 11/4011 |
| 2018/0307917 A1* | 10/2018 | Mittal | B60W 30/10 |
| 2018/0307930 A1* | 10/2018 | Mittal | G06K 9/00798 |
| 2019/0035101 A1* | 1/2019 | Kwant | G06N 3/0445 |
| 2019/0086546 A1* | 3/2019 | Tsishkou | G06K 9/627 |
| 2019/0113927 A1* | 4/2019 | England | G05D 1/0231 |
| 2019/0120967 A1* | 4/2019 | Smits | G01S 17/931 |
| 2019/0156566 A1* | 5/2019 | Chen | G09B 29/106 |
| 2019/0220717 A1* | 7/2019 | Shannon | G06K 19/0614 |
| 2019/0236381 A1* | 8/2019 | Rochan Meganathan | G06T 7/97 |

\* cited by examiner

METHOD AND DEVICE FOR IDENTIFYING CENTER OF A PATH FOR NAVIGATION OF AUTONOMOUS VEHICLES

TECHNICAL FIELD

This disclosure relates generally to autonomous vehicles and more particularly to method and device for identifying center of a path for navigation of autonomous vehicles.

BACKGROUND

An autonomous vehicle (a driverless car or a self-driving car) is a vehicle that is capable of sensing external environment and navigating without human input. An autonomous vehicle uses a variety of techniques to detect external environment or surroundings. Examples of these techniques may include, but are not limited to radar, laser light, Global Positioning System (GPS), odometer, and computer vision. For smooth navigation of unmanned or autonomous vehicles, an autonomous vehicle control should be robust enough to enable the autonomous vehicle to navigate without colliding into boundaries of a path.

A conventional system provides a method to maintain a vehicle's desired position on a roadway by monitoring vehicle sensor information and roadway information behind the vehicle through a rearward detection device. A desired vehicle position information is compared to a predicted future vehicle positional information. Based on a deviation in the predicted future position information from the desired vehicle positional information, a steering command is generated. Another conventional system discloses a lane keeping system for a vehicle by setting a safe zone in which the driver can drive the vehicle. The lane keeping system determines a target path for the vehicle based on certain parameters.

However, the conventional systems suffer from various drawbacks. One such drawback is that: a shortest path is plotted for vehicle's navigations, which may not be through the center of the road. Moreover, the shortest path, at certain sections of the road, may be in close proximity with a boundary of the road. This may result in impacting safety of the autonomous vehicle.

SUMMARY

In one embodiment, a method of identifying center of a path for navigation of an autonomous vehicle is disclosed. The method includes receiving, by a navigation device, a navigation map for a path connecting a destination point and an autonomous vehicle location point. The method further includes identifying, by the navigation device, a plurality of obstruction points along boundaries of the path based on the navigation map. The method includes determining, by the navigation device, a plurality of halfway points on the path based on the plurality of obstruction points. A halfway point is located between a straight line joining two consecutively identified obstruction points. The method further includes discarding, by the navigation device, at least one of the plurality of halfway points to extract a final set of halfway points on the path. The method includes arranging, by the navigation device, halfway points in the final set in a sequential order starting from the destination point to the autonomous vehicle location point.

In another embodiment, a navigation device for identifying center of a path for navigation of an autonomous vehicle is disclosed. The navigation device includes a processor and a memory communicatively coupled to the processor and having processor instructions stored thereon, causing the processor, on execution to receive a navigation map for a path connecting a destination point and an autonomous vehicle location point. The processor instructions further cause the processor to identify a plurality of obstruction points along boundaries of the path based on the navigation map. The processor instructions cause the processor to determine a plurality of halfway points on the path based on the plurality of obstruction points. A halfway point is located between a straight line joining two consecutively identified obstruction points. The processor instructions further cause the processor to discard at least one of the plurality of halfway points to extract a final set of halfway points on the path. The processor instructions cause the processor to arrange halfway points in the final set in a sequential order starting from the destination point to the autonomous vehicle location point.

In yet another embodiment, a non-transitory computer-readable storage medium is disclosed. The non-transitory computer-readable storage medium has instructions stored thereon, causing a navigation device that includes one or more processors to perform steps that include receiving a navigation map for a path connecting a destination point and an autonomous vehicle location point. The steps further include identifying a plurality of obstruction points along boundaries of the path based on the navigation map. The steps further include determining a plurality of halfway points on the path based on the plurality of obstruction points. A halfway point is located between a straight line joining two consecutively identified obstruction points. The steps include discarding at least one of the plurality of halfway points to extract a final set of halfway points on the path. The steps further include arranging halfway points in the final set in a sequential order starting from the destination point to the autonomous vehicle location point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
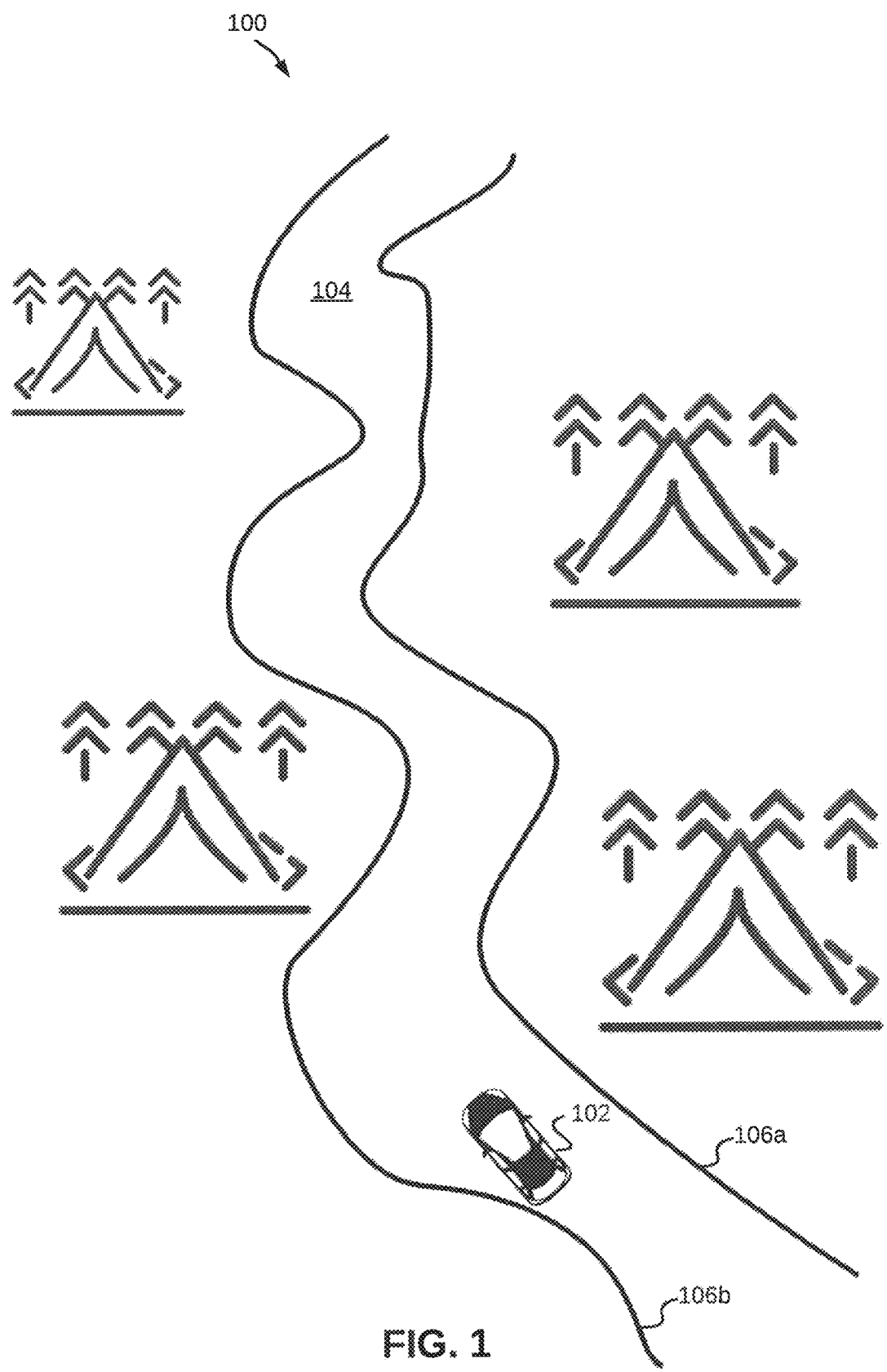
FIG. 1 illustrates an environment in which various embodiments may be employed.

Additional illustrative embodiments are listed below. In one embodiment, FIG. 1 illustrates an exemplary environment 100 in which various embodiments may be employed. Environment 100 includes a vehicle 102 that is traversing on a path 104. Vehicle 102 may be an unmanned, an autonomous, or a semi-autonomous vehicle and examples of vehicle 102, may include, but are not limited to car, bus, truck, van, or a two-wheeler. Path 104 may be a paved road, an unpaved road, or a rough and uneven trail. As is apparent from FIG. 1, boundaries of path 104 are not perfectly linear and are inconsistent. Additionally, there are significant variations in the distance between a boundary 106a and a boundary 106b of path 104 from one point to the other along path 104. As a result, vehicle 102, which is autonomous, is not able to accurately determine the navigable portion on path 104. This may lead to vehicle 102 colliding into one of boundaries 106a or 106b, when physical barriers (natural or artificial) mark boundaries 106a or 106b. Alternatively, in absence of such physical barriers, vehicle 102 may fall off path 104. A navigation device 200, illustrated in FIG. 2, prevents such an accident and subsequent breakdown of vehicle 102, by identifying halfway points along the length of path 104 up to a destination point. Vehicle 102, thereafter navigates along these halfway points to reach the destination point. This is further explained in detail in conjunction with FIG. 2.

Figure 2:
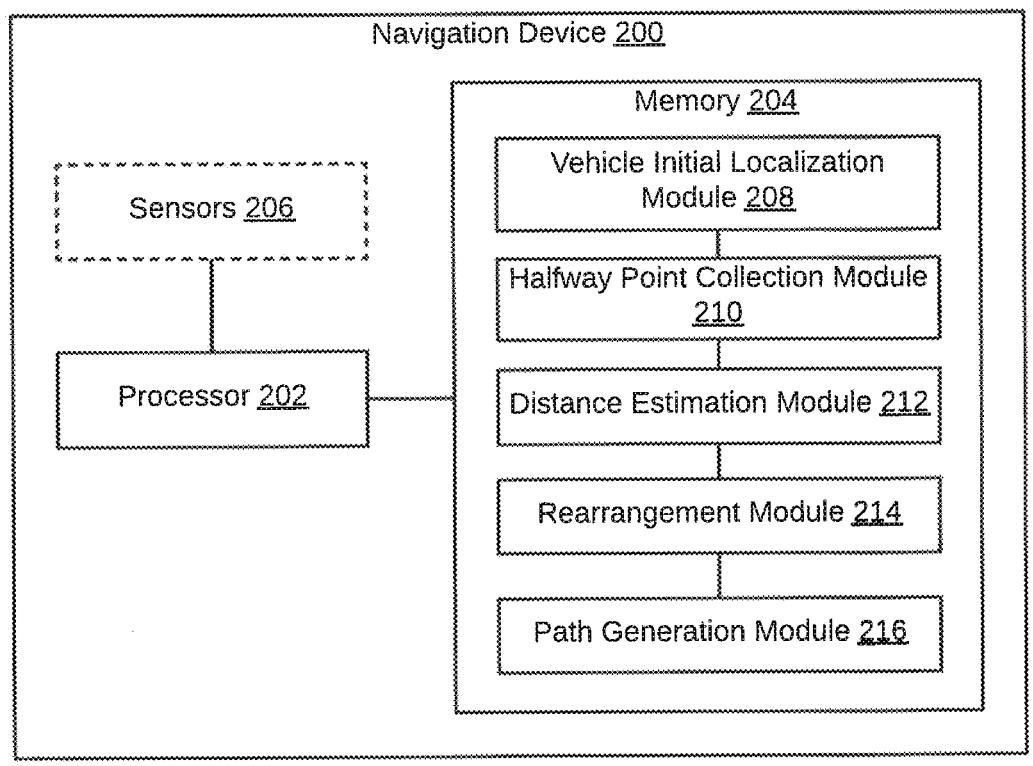
FIG. 2 is a block diagram illustrating various components within a navigation device, in accordance with an embodiment.

Referring now to FIG. 2, a block diagram of various components within navigation device 200 is illustrated, in accordance with an embodiment. Navigation device 200 may be implemented as a variety of portable computing device, such a smart phone, a dedicated handheld device, a tablet, or a phablet. Alternatively, navigation device 200 may be implemented as a distributed system, such that, few components of navigation device 200 reside in a portable device, while, other components may reside in a server, which may be located remotely or within a vehicle.

Navigation device 200 includes a processor 202 and a memory 204 communicatively coupled to processor 202. Memory 204 has processor instructions stored thereon, which on execution cause processor 202 to identify center of a path for navigation of an autonomous vehicle. Memory 204 includes instructions stored thereon, that cause processor 202, on execution to generate the distortion free image. Memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

Navigation device 200 may further include sensors 206 that are communicatively coupled to processor 202. Examples of sensors 206 may include, but are not limited to Light Detection And Ranging (LIDAR), Global Positioning System (GPS), laser light, odometer, and computer vision. In an embodiment, sensors 206 may be located within the autonomous vehicle, but outside navigation device 200. In this case, sensors 206 capture information related to external conditions and environment around the autonomous vehicle and share the same with navigation device 200 for further analysis.

In order to identify center of the path, memory 204 includes a vehicle initial localization module 208, a halfway point collection module 210, a distance estimation module 212, a rearrangement module 214, and a path generation module 216.

Vehicle initial localization module 208 receives a navigation map for a path connecting a destination point and an autonomous vehicle location point. The navigation map may be a LIDAR static map that includes point cloud data from obstacle reflection around the autonomous vehicle. In other words, the point cloud captures a 360-degree view around the autonomous vehicle. Based on the navigation map, vehicle initial localization module 208 initializes position of the autonomous vehicle on it. This is further explained in detail in conjunction with FIG. 3.

Figure 4:
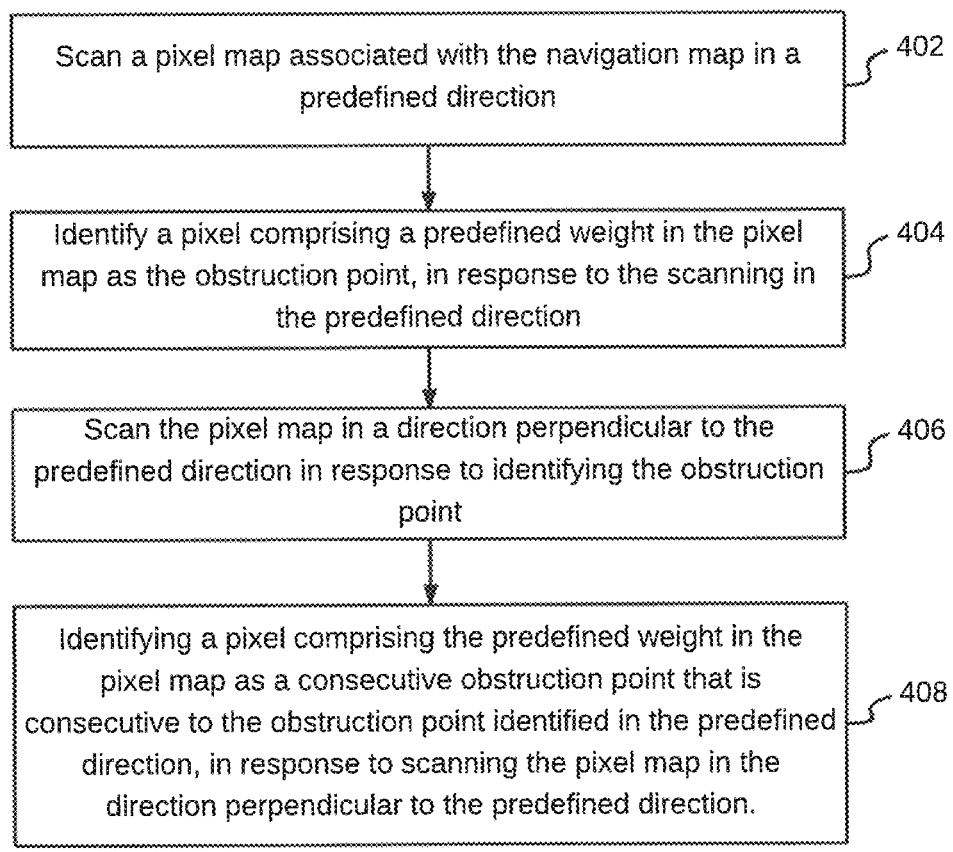
FIG. 4 illustrates a flowchart of a method for identifying obstruction points along boundaries of a path based on a navigation map, in accordance with an embodiment.
Figure 5:
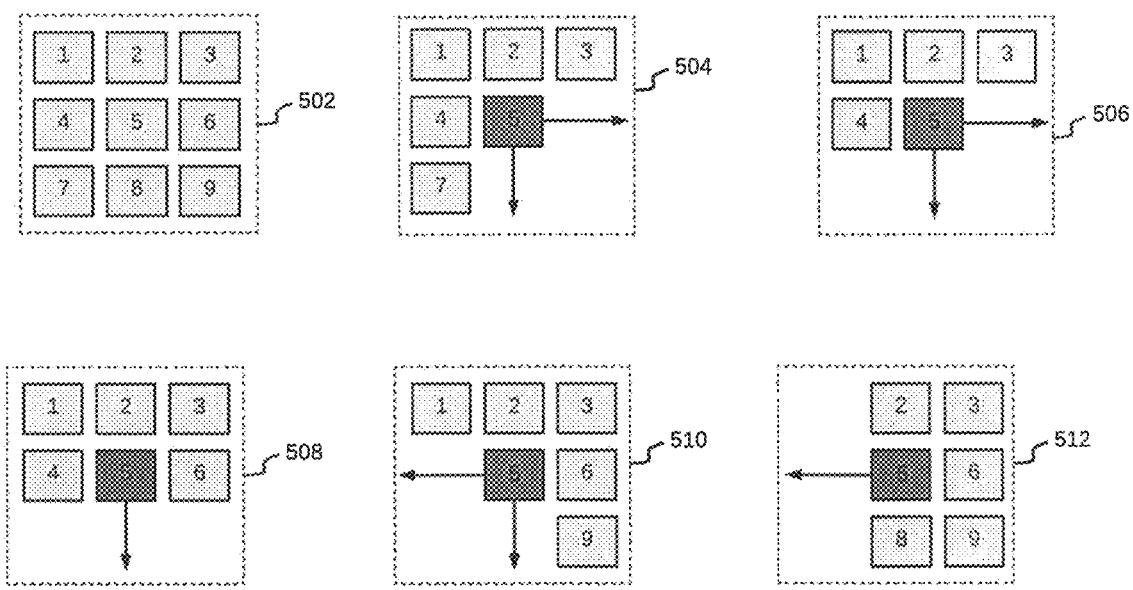
FIG. 5 illustrates a mechanism for identifying obstruction points along boundaries of a path using a pixel map representation of a navigation map, in accordance with an embodiment.
Figure 8:
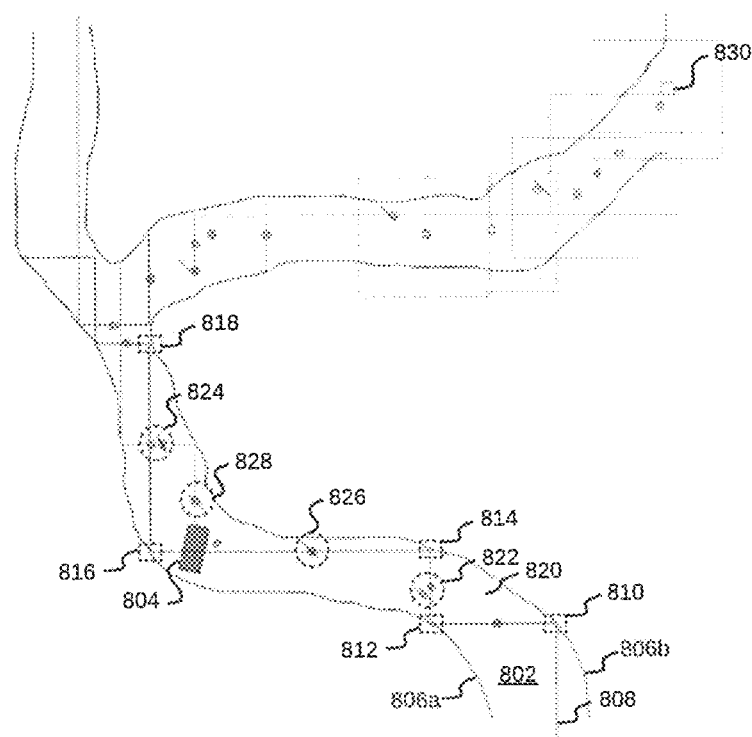
FIG. 8 illustrates identification of the plurality of halfway points and subsequent discarding of one or more of the plurality of halfway points, in accordance with an exemplary embodiment.

Starting from the initialized position of the autonomous vehicle, halfway point collection module 210 identifies a plurality of obstruction points along boundaries of the path. Halfway point collection module 210 also determines a plurality of halfway points on the path based on the plurality of obstruction points. A halfway point is located between a straight line joining two consecutively identified obstruction points. This is further explained in detail in conjunction with FIG. 3. FIG. 4, FIG. 5, and FIG. 8.

Thereafter, distance estimation module 212 determines distance of each new halfway point from previously identified halfway points. Distance estimation module 212 then performs a check to determine whether this distance is less than a predefined distance threshold. Additionally, distance estimation module 212 determines distance of each halfway point from boundaries of the path. Distance estimation module 212 then performs a check to determine whether this distance is less than a predefined proximity threshold. Distance estimation module 212 shares the result of comparing distance and predefined thresholds for each halfway point, with rearrangement module 214, which discards one or more of the plurality of halfway points to extract a final set of halfway points. Each of the one or more the plurality of halfway points are thus discarded either based on close proximity with other halfway point or with one of the boundaries of the path. This is explained in detail in conjunction with FIG. 6, FIG. 7, and FIG. 8. Rearrangement module 214 also arranges halfway points in the final set in a sequential order starting from the destination point to the autonomous vehicle location point. This is explained in detail in conjunction with FIG. 9 and FIG. 10.

Once halfway points in the final set have been arranged in a sequential order, path generation module 216 applies a curve fit mechanism through these halfway points to generate a final path for traversal or navigation of the autonomous vehicle from the autonomous vehicle location point to the destination point. This is further explained in detail in conjunction with FIG. 3.

Figure 3:
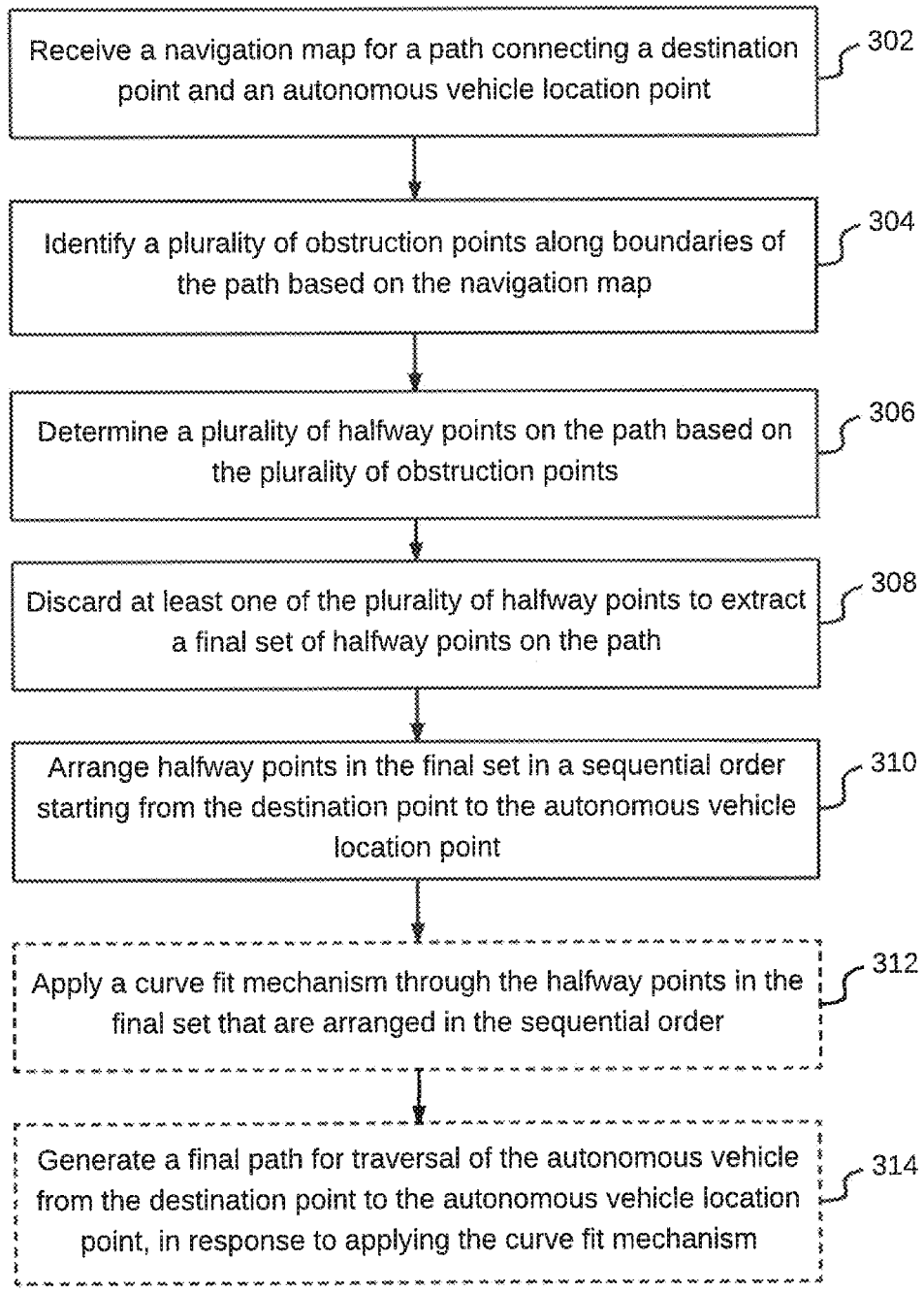
FIG. 3 illustrates a flowchart of a method for identifying center of a path for navigation of an autonomous vehicles, in accordance with an embodiment.

Referring now to FIG. 3, a flowchart of a method for identifying center of a path for navigation of an autonomous vehicle is illustrated, in accordance with an embodiment. At step 302, navigation device 200 receives a navigation map for the path connecting a destination point and an autonomous vehicle location point. The autonomous vehicle location point may be the current location of the autonomous vehicle and may keep on changing as the autonomous vehicle keeps moving along the path. The navigation map may be a LIDAR static map that includes point cloud data from obstacle reflection around the autonomous vehicle. In other words, the point cloud captures a 360-degree view around the autonomous vehicle. The LIDAR static map also initializes position of the autonomous vehicle.

At step 304, navigation device 200 identifies a plurality of obstruction points along boundaries of the path based on the navigation map. The plurality of obstructions points may be identified using a pixel map associated with the navigation map. A given obstruction point may be identified by scanning the pixel map in a predefined direction, for example, a horizontal direction. To identify a consecutive obstruction point along one of the boundaries, the direction of scanning may be changed, such that, the pixel map is scanned in a direction that is perpendicular to the predefined direction, i.e., vertical direction. Thus, an obstruction point is identified each time a scan line touches one of the either boundaries of the path. After the scan line touches one of the boundaries, the direction of the scan line changes by 90 degrees and a consecutive obstruction point is identified when the scan line touches the same or other boundary of the path. In other words, two consecutive obstruction points are identified on same or alternate boundaries of the path. It will be apparent to a person skilled in the art that multiple iterations starting from the autonomous location point and then from subsequently identified half way points when available after first iteration, to the destination point are performed to identify the plurality of obstruction points. This is further explained in detail in conjunction with FIG. 4.

Based on the plurality of obstruction points, navigation device 200, at step 306, determines a plurality of halfway points on the path. A halfway point is located between a straight line joining two consecutively identified obstruction points. As two consecutively identified obstruction points are identified on alternate boundaries of the path, the halfway point may approximately lie midway between at least two obstruction points on the boundaries. This is further explained in detail in conjunction with FIG. 8.

Once the plurality of halfway points is identified, navigation device 200 discards one or more of the plurality of halfway points in order to extract a final set of halfway points on the path. A halfway point may be discarded because of its close proximity with the previously identified halfway points. This is further explained in detail in conjunction with FIG. 6. Additionally, a halfway point may also be discarded because of its close proximity with one of the boundaries of the path. This is further explained in detail in conjunction with FIG. 7. Discarding one or more halfway points ensures that an optimum number of accurate halfway points are identified and are thereafter used for charting out a navigation path for the autonomous vehicle.

Navigation device 200, at step 310, arranges halfway points in the final set in a sequential order starting from the destination point to the autonomous vehicle location point. To this end, each halfway point in the final set is first plotted on a static graph that matches dimensions of the navigation map. The static graph is analyzed to arrange the halfway points in a sequential order. This is further explained in detail in conjunction with FIG. 9 and FIG. 10. After the halfway points in the final set are arranged in the sequential order, navigation device 200 applies a curve fit mechanism through these halfway points at step 312. Thereafter, at step 314, navigation device 200 generates a final path for traversal or navigation of the autonomous vehicle from the autonomous vehicle location point to the destination point.

Referring now to FIG. 4, a flowchart of a method for identifying obstruction points along boundaries of a path based on a navigation map is illustrated, in accordance with an embodiment. Once the navigation map is received by navigation device 200, a pixel map associated with the navigation map is created in order to identify obstruction points. Starting from the autonomous vehicle location point (which is the current location of the autonomous vehicle), the pixel map is scanned in a predefined direction, at step 402. Based on the orientation and location of the autonomous vehicle, the scanning may be initiated in the horizontal direction. A first scanning operation may be initiated towards one of the boundaries of the path and simultaneously, a second scanning operation is initiated towards the other boundary of the path. Thus, the predefined direction may be the horizontal direction towards both boundaries of the path to start with. In an embodiment, the pixel map may be scanned in portions, such that, at a given time only a portion of the pixel map, which includes nine pixels, is scanned. This is further explained in detail in the exemplary embodiment of FIG. 5.

In response to the scanning, at step 404, a pixel that has a predefined weight in the pixel map is identified as an obstruction point on one of the boundaries of the path. The predefined weight, for example, may be associated with a particular color of the pixel. In an embodiment, different weights may be assigned to different color shades and based on the terrain of the path and existing environmental or other external conditions associated with the path, a particular weight may be selected for being identified as an obstruction point. In an embodiment, a color of a pixel that is to be identified as an obstruction point on a boundary of the path, may be of a darker shade when compared with adjacent pixels. This is further explained in detail in the exemplary embodiment of FIG. 5.

Once an obstruction point is identified, the pixel map is scanned in a direction that is perpendicular to the predefined direction, at step 406. As the obstruction point was identified while scanning in the horizontal direction, the consecutive scanning of the pixel map is performed in the vertical direction. It will be apparent to a person skilled in the art that multiple such scanning operations may be performed simultaneously, such that, multiple obstruction points are identified along the length of one of the boundaries of the path at any given time. This is further explained in detail in conjunction with the exemplary embodiment of FIG. 8.

Thereafter, at step 408, a pixel that has the predefined weight in the pixel map is identified as a consecutive obstruction point, such that, it is consecutive to the obstruction point identified at step 404. Two consecutive obstruction points may be identified on opposite boundaries of the path, as the first scanning direction for this iteration is horizontal and the second and every alternative (i.e., 2, 4, 6 and so on) scanning direction is vertical.

Referring now to FIG. 5, a mechanism for identifying obstruction points along boundaries of a path using a pixel map representation of a navigation map is illustrated, in accordance with an embodiment. The pixel map is scanned in portions, such that, at a given time only a portion 502 of the pixel map is scanned. Portion 502 of the pixel map includes a grid of nine pixels, which are scanned by navigation device 200 at a given time. Based on a scan of portion 502, navigation device 200 may identify one of the pixels, which has a predefined weight, as an obstruction point on a boundary of the path and accordingly change the direction or course of scanning the pixel map. In an embodiment, when an imaginary horizontal or vertical line initiated from a starting point (which may be autonomous vehicle's current position, an obstruction point or a previously found halfway point) encounters a pixel of different weight, that point is considered as an obstruction point.

By way of an example, while scanning a portion 504, coming on the way of imaginary line; when navigation device 200 encounters the pixel numbered '5,' which has the predefined weight, navigation device 200 changes the course or direction of scanning, based on the previous direction of scanning. Thus, the subsequent direction of scanning will be vertical, if the previous direction of scanning was horizontal and vice versa. In a similar manner, for portions 506, 508, 510, and 512, navigation device 200 may change the direction or course of scanning the pixel map after encountering the pixel numbered '5,' as indicated in FIG. 5.

Figure 6:
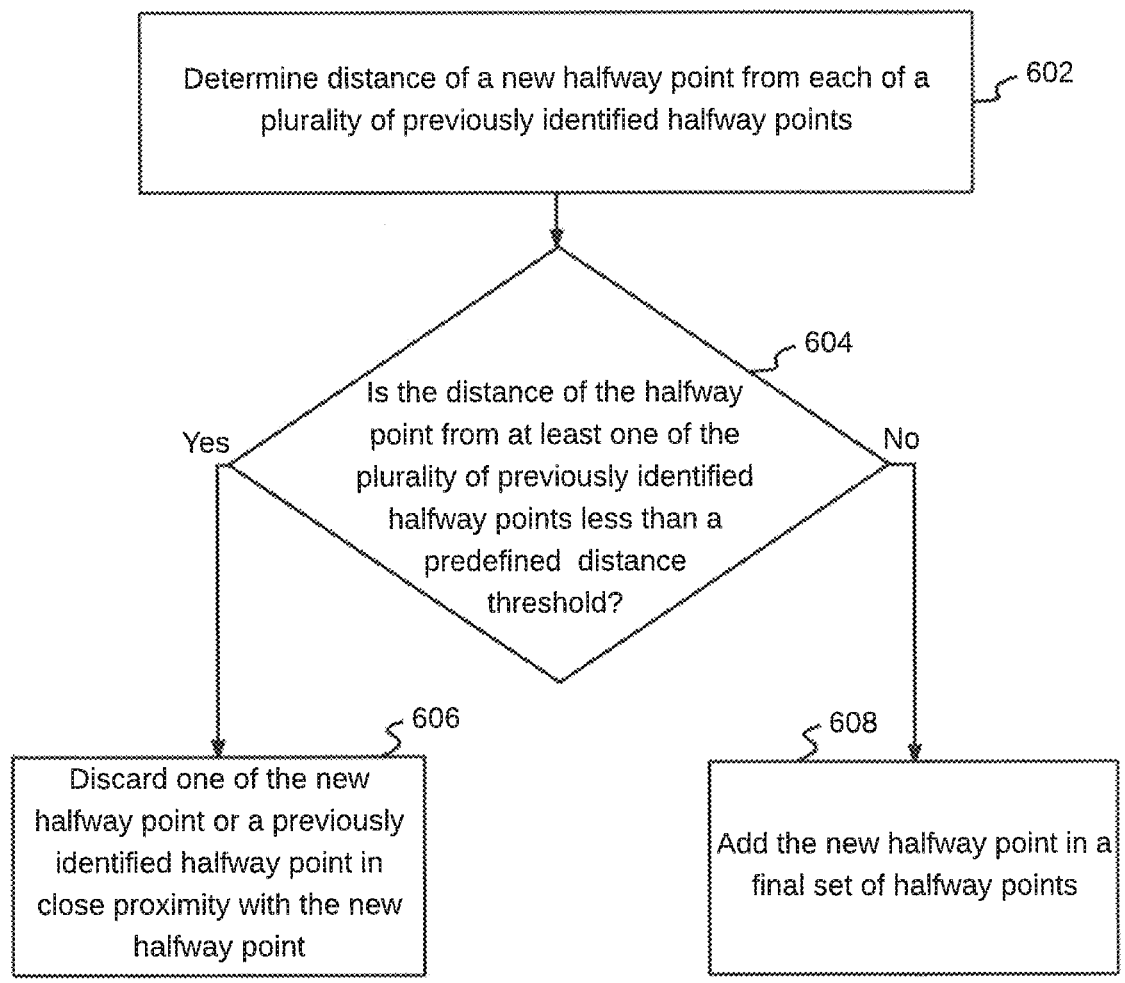
FIG. 6 illustrates a flowchart of a method for discarding one or more of a plurality of halfway points based on proximity with each other, in accordance with an embodiment.

Referring now to FIG. 6, a flowchart of a method of discarding one or more of a plurality of halfway points based on proximity with each other is illustrated, in accordance with an embodiment. A halfway point on the path is determined by locating center of a straight line joining two consecutively identified obstruction points. This is depicted in the exemplary embodiment of FIG. 8. Each time a new halfway point is determined, distance of the new halfway point from each of a plurality of previously identified halfway points is determined at step 602. The plurality of previously identified halfway points may include all halfway points that have been determined for all scanning operations, which are performed separately, to identify obstruction points on boundaries of the path. In an embodiment, the number of previously identified halfway points, with which the new halfway point is compared, may be limited to a predefined number. This may enable optimizing or reducing the number of computations required to compare distance with previously identified halfway points.

At step 604, a check is performed to determine if distance of the new halfway point from one or more of the plurality of previously identified halfway points is less than a predefined distance threshold. When distance of the new halfway point from one or more of the plurality of previously identified halfway points is less than the predefined distance threshold, one of the new halfway point or the previously identified halfway point that the new halfway point is compared with, is discarded at step 606. In other words, when two halfway points are very close to each other, one of these halfway points is discarded. In an embodiment, one of the two halfway points that is comparatively closer to one of the boundaries of the path is discarded.

Referring back to step 604, when distance of the new halfway point from each of the plurality of previously identified halfway points is more than the predefined distance threshold, the new halfway points is added to a final set of halfway points at step 608. Thereafter, a consecutive halfway point is determined and the above steps are repeated for the consecutive halfway point. In an exemplary embodiment, equation 1 given below is used to determine whether a halfway point should be discarded or not:

$$\sqrt{(X_1-X_2)^2+(Y_1-Y_2)^2} < D \quad (1)$$

where, $X_1$ and $Y_1$ are coordinates of the new halfway point, $X_2$ and $Y_2$ are coordinates of a previously identified halfway point, D is the predefined threshold When the above equation is satisfied, one of the new halfway point and the previously identified point are assessed in order to determine which of the two halfway points is more centered in the path. In other words, which of the two halfway points is farther from the boundaries of the path. Distance from the boundaries of the path is measured in four directions, i.e., north, south, east, and west. One of the two halfway points that is closer to one or more of the boundaries of the path is discarded and the other halfway point is retained and added to the final set of halfway points. By way of an example, the new halfway point is found to be closer to one of the boundaries of the path and is thus discarded.

In an embodiment, proximity of a halfway point to one of the boundaries of the road may be measured independent of its distance from one or more previously identified halfway points. This is explained in detail in conjunction with FIG. 7.

Figure 7:
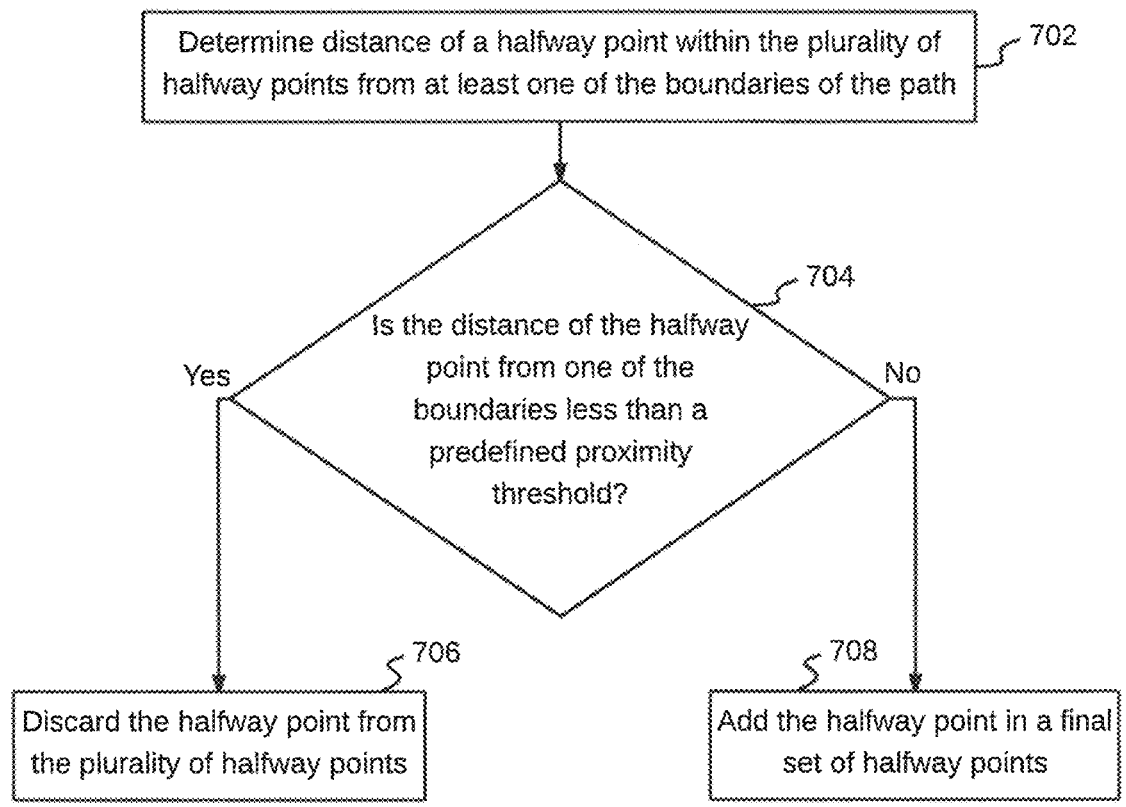
FIG. 7 illustrates a flowchart of a method of discarding one or more of a plurality of halfway points based on proximity with one of the boundaries of a path, in accordance with another embodiment.

Referring now to FIG. 7, a flowchart of a method of discarding one or more of a plurality of halfway points based on proximity with one of the boundaries of a path is illustrated, in accordance with an embodiment. After the plurality of halfway points have been determined, distance of a halfway point from one or more boundaries of the path is determined at step 702. At step 704, a check is performed to determine whether the distance of the halfway point from one of the boundaries of the path is less than a predefined proximity threshold. The predefined proximity threshold may be determined based on historically determined safe driving distance from a path's boundary. In an embodiment, when a halfway point is determined between two obstruction points that are in the same horizontal line, then distance from one or more of the boundaries is measured in both vertical directions, i.e., upwards and downwards. Similarly, when a halfway point is determined between two obstruction points that are in the same vertical line, then distance of the halfway point from one or more of the boundaries is measured in both horizontal directions, i.e., left and right.

Referring back to step 704, when the distance of the halfway point is less than the predefined proximity threshold, the halfway point is discarded from the plurality of halfway points at step 706. However, when the distance is more than or equal to the predefined proximity threshold, the halfway point is added to a final set of halfway points at step 708. It will be apparent to a person skilled in the art that the above steps are repeated for each halfway points in the plurality of halfway points. The discarding of halfway points based on methods discussed in FIG. 6 and FIG. 7 are depicted in conjunction with an exemplary embodiment of FIG. 8.

Referring now to FIG. 8, a plurality of halfway points determined for a path 802 and subsequent discarding of one or more of the plurality of halfway points is illustrated, in accordance with an exemplary embodiment. An autonomous vehicle 804 is traversing on path 802, which has two boundaries, i.e., a boundary 806a and a boundary 806b. Autonomous vehicle 804 has to reach a destination point 830 while navigating on path 802. The plurality of halfway points is determined based on multiple obstruction points identified along boundaries 806a and 806b. Examples of obstruction points identified during a first scanning operation depicted by a ray 808 include, an obstruction point 810, an obstruction point 812, an obstruction point 814, an obstruction point 816, and an obstruction point 818. Obstruction point 816 is identified while scanning in the horizontal direction and a consecutive obstruction point 818 is identified while scanning in the vertical direction. As depicted in FIG. 8, halfway points are identified as center of a straight line joining each of these consecutive obstruction points.

Simultaneous to the first scanning operation, a second scanning operation, represented by a ray 820, is also performed to identify obstruction point. In a manner similar to that discussed above, obstruction points are identified on boundaries 806a and 806b by ray 820. Referring back to FIG. 6, when a new halfway point is determined, distance of the new halfway point is compared with each previously identified halfway point. When the distance is below the predefined distance threshold, one of these halfway points that is closer to one of boundaries 806a and 806b is discarded. This is depicted, by way of an example, in 822 and 824, where the halfway point, which is to be discarded is marked with "\".

Referring back to FIG. 7, distance of each halfway point from boundaries 806a and 806b is also determined and is compared with the predefined proximity threshold. Those halfway points, for which, the distance is less than the predefined proximity threshold, are discarded. Two of these halfway points are depicted in 826 and 828. Similarly, other halfway points, which meet criteria for discarding halfway points, as specified in FIG. 6 and FIG. 7, are discarded to obtain a final set of halfway points that are used for further analysis.

Figure 9:
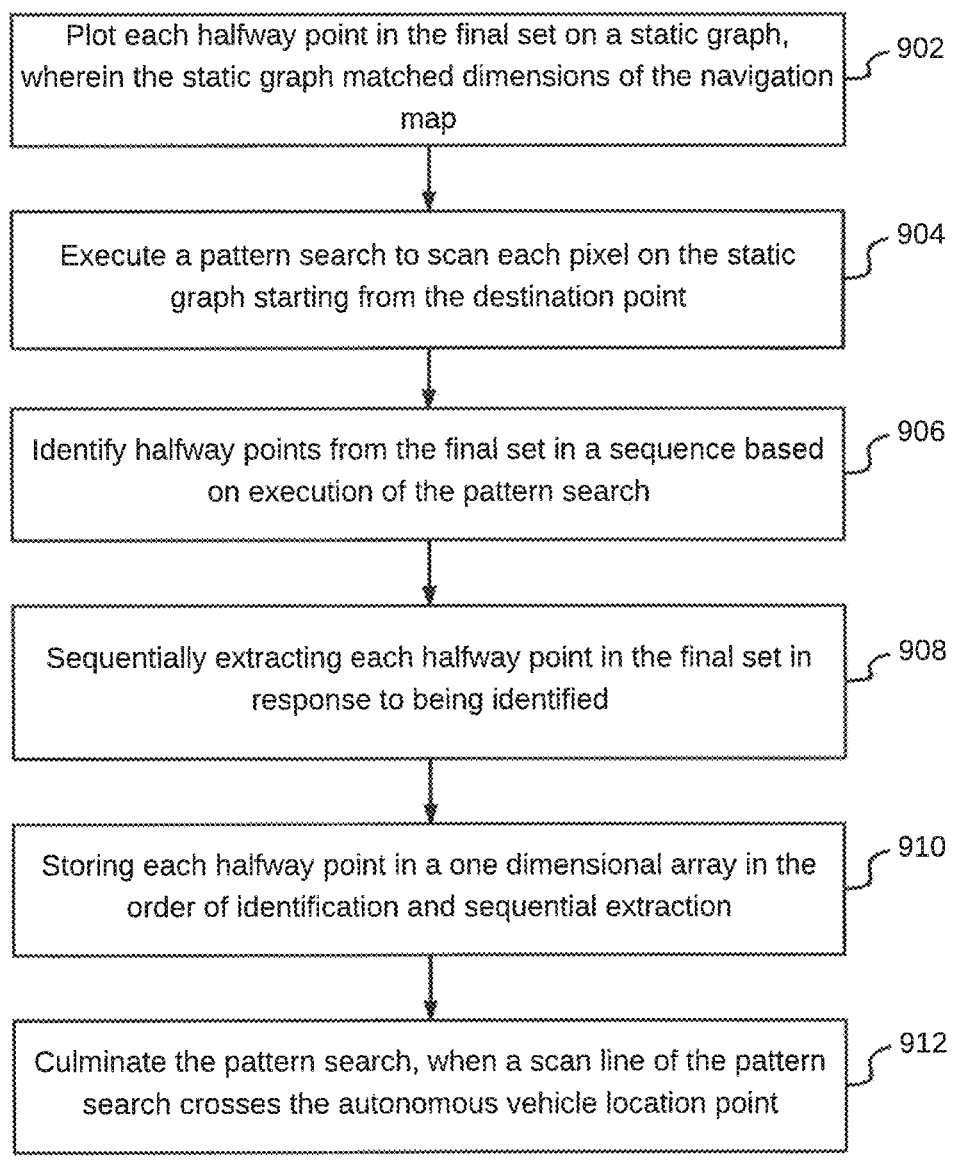
FIG. 9 illustrates a flowchart of a method for arranging halfway points in the final set in a sequential order, in accordance with an embodiment.

Referring now to FIG. 9, a flowchart of a method for arranging halfway points in a final set in a sequential order is illustrated, in accordance with an embodiment. Once the final set of halfway points is obtained, at step 902, each halfway point in the final set is plotted on a static graph along with a destination point and an autonomous vehicle location point. The static graph matches dimensions of the navigation map, which ensures that the static graph, which includes the plotted halfway points, can be accurately overlaid over the navigation map. Thereafter, at step 904, a pattern search is executed to scan each pixel on the static graph starting from the destination point. The pattern search may be one of a box search or a circle search.

Based on execution of the pattern search, halfway points are identified from the final set in a sequence, at step 906. A halfway point is identified when a box or circular scan line of the pattern search touches and crosses the halfway point. In conjunction with identifying, each halfway point in the final set is sequentially extracted at step 908. In other words, the extracted halfway point is removed from a container associated with the static graph. The container may be a one-dimensional array storing information associated with halfway points in the final set in a non-sequential order. After extraction, each halfway point is stored in a one-dimensional array in the order of identification, at step 910. When a box or circular scan line of the pattern search touches and crosses the autonomous vehicle location point, the pattern search is culminated at step 912. This is further explained in detail in conjunction with an exemplary embodiment of FIG. 10.

Figure 10:
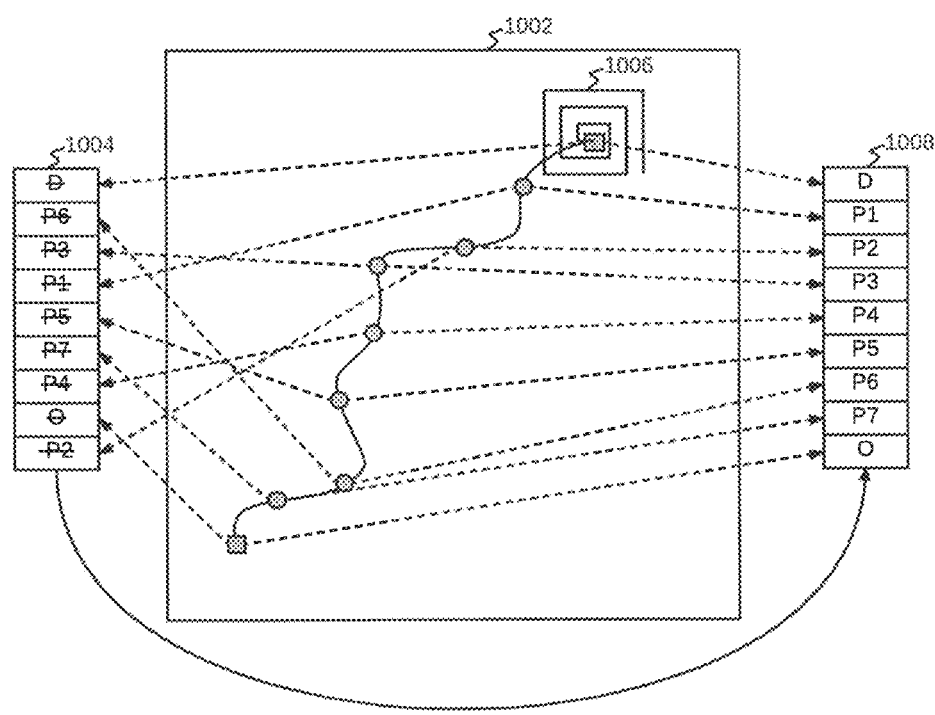
FIG. 10 illustrates arranging halfway points in a sequential order starting from a destination point to an autonomous vehicle location point, in accordance with an exemplary embodiment.

Referring now to FIG. 10, arranging halfway points in a sequential order starting from a destination point to an autonomous vehicle location point is illustrated, in accordance with an exemplary embodiment. The final set of halfway points include halfway points 'P1,' 'P2,' 'P3,' 'P4,' 'P5,' 'P6,' and 'P7'. Each of these halfway points along with a destination point 'D' and an autonomous vehicle location point 'O' are plotted on a static graph 1002. The information regarding the plotted halfway points, the destination point 'D,' and the autonomous vehicle location point 'O,' is stored in a one-dimensional array 1004 in a non-sequential order. Thereafter, a box search 1006 is executed to scan each pixel on static graph 1002 starting from the destination point 'D'.

Box search 1006 enables identification of halfway points P1 to P7 that are plotted on static graph 1002 in a sequence. As box search 1006 moves forward with identification of the next halfway point on static graph 1002, size of box search is increased. When a scan line of box search 1006 touches and crosses a halfway point, the halfway point is extracted from static graph 1002 and is stored in a one-dimensional array 1008. The halfway point is then removed from static graph 1002 so that it does not appear in a consecutive box search 1006. The destination point 'D' is extracted first, followed by the halfway points 'P1,' 'P2,' 'P3,' 'P4,' 'P5,' 'P6,' 'P7,' and the autonomous vehicle location point 'O'. Thus, all these points plotted on static graph 1002 are extracted and stored in the sequence of extraction in one-dimensional array 1008 depicted in FIG. 10. Once the autonomous vehicle location point 'O' is extracted from static graph 1002 and stored in one-dimensional array 1008, box search 1006 culminates. Thereafter, a curve fit mechanism is applied through the halfway points stored in one-dimensional array 1008 to generate a final path for traversal or navigation of the autonomous vehicle from the autonomous vehicle location point 'O' to the destination point 'D'.

Figure 11:
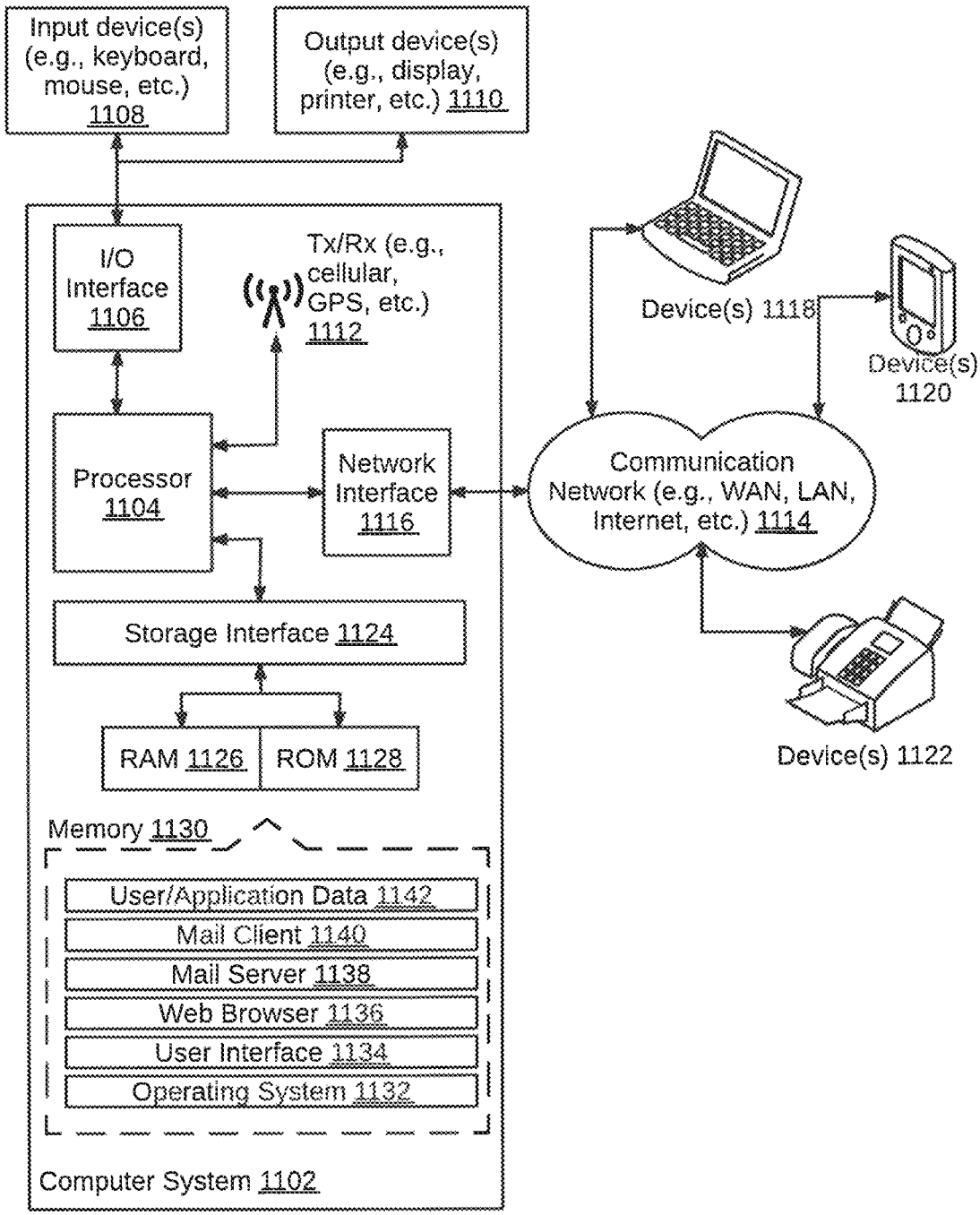
FIG. 11 illustrates a block diagram of an exemplary computer system for implementing various embodiments.

Referring now to FIG. 11, a block diagram of an exemplary computer system for implementing various embodiments is illustrated. Computer system 1102 may include a central processing unit ("CPU" or "processor") 1104 that includes at least one data processor for executing program components for executing user-generated requests or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1110 may be a printer, fax machine, video display (e.g., cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (e.g., using Wireless Application Protocol), the Internet, etc. Using network interface 1116 and communication network 1114, computer system 1102 may communicate with devices 1118, 1120, and 1122. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of the devices.

In some embodiments, processor 1104 may be disposed in communication with one or more memory devices (e.g., RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (e.g., any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for identifying center of a path for navigation of autonomous vehicles. The device and method enable accurate detection of the center of the path, thereby, avoiding collision of an autonomous vehicle with a boundary, while traversing on the path. In this method, multiple halfway points are detected and subsequently one or more halfway points are discarded based on close proximity with each other or with the boundaries of the path. As a result, accuracy of detecting center of the path is significantly increased.

The specification has described method and device for identifying center of a path for navigation of autonomous vehicles. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art (s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of identifying center of a path for navigation of an autonomous vehicle, the method comprising:
   receiving, by a navigation device, a navigation map for a path connecting a destination point and an autonomous vehicle location point;
   determining, by the navigation device, a plurality of obstruction points along boundaries of the path based on the navigation map, wherein an obstruction point of the plurality of obstruction points is determined by:
      scanning a pixel map associated with the navigation map in a first direction; and
      identifying, in response to the scanning, a first pixel of the pixel map as the obstruction point, the first pixel having a predefined weight;
   determining, by the navigation device, a plurality of halfway points on the path based on the plurality of obstruction points, wherein a halfway point is located between a straight line joining two consecutively identified obstruction points;
   discarding, by the navigation device, at least one of the plurality of halfway points to extract a final set of halfway points on the path; and
   arranging halfway points in the final set of halfway points in a sequential order starting from the destination point to the autonomous vehicle location point.

2. The method of claim 1 further comprising:
   applying a curve fit mechanism through the halfway points in the final set of halfway points that are arranged in the sequential order; and
   generating a final path for traversal of the autonomous vehicle from the destination point to the autonomous vehicle location point, in response to applying the curve fit mechanism.

3. The method of claim 1, wherein the navigation map is a Light Detection and Ranging (LIDAR) static map comprising point cloud data from obstacle reflection around the autonomous vehicle.

4. The method of claim 1, wherein the predefined weight of the first pixel is associated with a color of the first pixel.

5. The method of claim 1, further comprising determining a consecutive obstruction point of the plurality of obstruction points by:
   scanning the pixel map in a second direction in response to identifying the obstruction point; and
   identifying a second pixel of the pixel map as the consecutive obstruction point, wherein the second direction is perpendicular to the first direction.

6. The method of claim 1, wherein discarding one of the at least one halfway point comprises:
   determining distance of a new halfway point from each of a plurality of previously identified halfway points, wherein the plurality of halfway points comprises the new halfway point and the plurality of previously identified halfway points; and
   discarding the new halfway point, when distance of the halfway point from at least one of the plurality of previously identified halfway points is less than a predefined distance threshold.

7. The method of claim 1, wherein discarding one of the at least one halfway points comprises:
   determining distance of a halfway point within the plurality of halfway points from at least one of the boundaries of the path; and
   discarding the halfway point from the plurality of halfway points, when distance of the halfway point is less than a predefined proximity threshold.

8. The method of claim 1, wherein arranging the halfway points in the final set of halfway points in the sequential order comprises plotting each halfway point in the final set of halfway points on a static graph, wherein the static graph matches dimensions of the navigation map.

9. The method of claim 8 further comprising:
   executing a pattern search to scan each pixel on the static graph starting from the destination point, wherein the pattern search comprises one of a box search or a circle search;
   identifying halfway points from the final set of halfway points in a sequence based on execution of the pattern search, wherein a halfway point is identified when a scan line of the pattern search touches and crosses the halfway point; and
   culminating the pattern search, when a scan line of the pattern search touches and crosses the autonomous vehicle location point.

10. The method of claim 9, further comprising:
    sequentially extracting each halfway point in the final set of halfway points in response to being identified; and
    storing each halfway point in a one dimensional array in the order of identification.

11. A navigation device for identifying center of a path for navigation of an autonomous vehicle, the navigation device comprising:
    a processor; and
    a memory communicatively coupled to the processor and having processor instructions stored thereon, causing the processor, on execution to:
    receive a navigation map for a path connecting a destination point and an autonomous vehicle location point;
    determine a plurality of obstruction points along boundaries of the path based on the navigation map, wherein an obstruction point of the plurality of obstruction points is determined by:
       scanning a pixel map associated with the navigation map in a first direction; and
       identifying, in response to the scanning, a first pixel of the pixel map as the obstruction point, the first pixel having a predefined weight;
    determine a plurality of halfway points on the path based on the plurality of obstruction points, wherein a halfway point is located between a straight line joining two consecutively identified obstruction points;
    discard at least one of the plurality of halfway points to extract a final set of halfway points on the path; and
    arrange halfway points in the final set of halfway points in a sequential order starting from the destination point to the autonomous vehicle location point.

12. The navigation device of claim 11, wherein the processor instructions further cause the processor to:
    apply a curve fit mechanism through the halfway points in the final set of halfway points that are arranged in the sequential order; and
    generate a final path for traversal of the autonomous vehicle from the destination point to the autonomous vehicle location point, in response to applying the curve fit mechanism.

13. The navigation device of claim 11, wherein the predefined weight of the first pixel is associated with a color of the first pixel.

14. The navigation device of claim 11, wherein the processor instructions further cause the processor to determining a consecutive obstruction point of the plurality of obstruction points by:
    scanning the pixel map in a second direction in response to identifying the obstruction point; and
    identifying a second pixel of the pixel map as the consecutive obstruction point, wherein the second direction is perpendicular to the first direction.

15. The navigation device of claim 11, wherein to discard one of the at least one halfway point, the processor instructions further cause the processor to:
    determine distance of a new halfway point from each of a plurality of previously identified halfway points, wherein the plurality of halfway points comprises the new halfway point and the plurality of previously identified halfway points; and
    discard the new halfway point, when distance of the halfway point from at least one of the plurality of previously identified halfway points is less than a predefined distance threshold.

16. The navigation device of claim 11, wherein to discard one of the at least one halfway points, the processor instructions further cause the processor to:
    determining distance of a halfway point within the plurality of halfway points from at least one of the boundaries of the path; and
    discarding the halfway point from the plurality of halfway points, when distance of the halfway point is less than a predefined proximity threshold.

17. The navigation device of claim 11, wherein to arrange the halfway points in the final set of halfway points in the sequential order, the processor instructions further cause the processor to plot each halfway point in the final set of halfway points on a static graph, wherein the static graph matches dimensions of the navigation map.

18. The navigation device of claim 17, wherein the processor instructions further cause the processor to:
    execute a pattern search to scan each pixel on the static graph starting from the destination point, wherein the pattern search comprises one of a box search or a circle search;
    identify halfway points from the final set of halfway points in a sequence based on execution of the pattern search, wherein a halfway point is identified when a scan line of the pattern search touches and crosses the halfway point; and
    culminate the pattern search, when a scan line of the pattern search touches and crosses the autonomous vehicle location point.

19. A non-transitory computer-readable storage medium is disclosed, the non-transitory computer-readable storage medium has instructions stored thereon, causing a navigation device that includes one or more processors to perform steps including:
- receiving a navigation map for a path connecting a destination point and an autonomous vehicle location point;
- determining a plurality of obstruction points along boundaries of the path based on the navigation map, wherein an obstruction point of the plurality of obstruction points is determined by:
  - scanning a pixel map associated with the navigation map in a first direction; and
  - identifying, in response to the scanning, a first pixel of the pixel map as the obstruction point, the first pixel having a predefined weight;
- determining a plurality of halfway points on the path based on the plurality of obstruction points, wherein a halfway point is located between a straight line joining two consecutively identified obstruction points;
- discarding at least one of the plurality of halfway points to extract a final set of halfway points on the path; and
- arranging halfway points in the final set of halfway points in a sequential order starting from the destination point to the autonomous vehicle location point.

* * * * *